March 3, 1970  KARL-HEINZ HOLDERBAUM  3,498,200
DIAPHRAGM CONTROL FOR OPTICAL OBJECTIVE
Filed May 24, 1967

Karl-Heinz Holderbaum
Inventor.

By Karl G. Ross
Attorney

United States Patent Office 3,498,200
Patented Mar. 3, 1970

3,498,200
DIAPHRAGM CONTROL FOR OPTICAL OBJECTIVE
Karl-Heinz Holderbaum, Bad Kreuznach, Germany, assignor to Jos. Schneider & Co., Bad Kreuznach, Germany, a corporation of Germany
Filed May 24, 1967, Ser. No. 640,985
Claims priority, application Germany, June 10, 1966, Sch 39,097
Int. Cl. G03b 9/02
U.S. Cl. 95—64                  5 Claims

ABSTRACT OF THE DISCLOSURE

Optical objective with a lens barrel divided into two axially adjoining parts each supporting one or more lenses, the two parts having confronting annular shoulders bracketing an iris diaphragm whose leaves are pivoted on one shoulder and coact with radial slots or other guiding formations on the other shoulder whereby the diaphragm aperture can be adjusted by relative rotation of the two parts about the optical axis of the objective.

---

My present invention relates to an optical objective in which an iris diaphragm is inserted between two optical components.

In a conventional objective of this type, the optical components are coaxially mounted in a lens barrel also accommodating a pair of relatively rotatable rings, one of these rings serving as a pivotal mounting for the iris leaves of the diaphragm while the other ring is formed with grooves or slots engaging lugs or pins on these leaves, offset from the respective fulcra thereof, to swing them simultaneously toward or away from the optical axis upon rotation of this latter ring in one direction or the other. To rotate the diaphragm-control ring, a rotatable setting ring is usually provided on the lens barrel; the barrel must then be provided with a peripheral slot to accommodate a link connecting the two jointly rotatable rings.

An object of this invention is to provide a simplified and highly compact objective construction enabling adjustment of an iris diaphragm without the use of separate mounting and control rings.

Another object of my invention is to eliminate the need for an external setting ring in adjusting an iris diaphragm.

These objects are realized, in accordance with my instant invention, by the provision of an objective whose lens barrel is divided into two axially adjoining parts each supporting one or more components of the objective, the two parts being formed with confronting annular shoulders bracketing an iris diaphragm whose leaves are pivoted on one shoulder and coact with guiding formations, such as radial grooves, on the other shoulder whereby the diaphragm aperture can be adjusted by relative rotation of the two parts about the optical axis of the objective.

The two relatively rotating parts of the lens barrel may be provided with coacting indexing means for releasably retaining them in different relative angular positions. The extent of the relative rotation may be limited by suitable stops, e.g. in the form of the ends of an arcuate cutout in one of the parts engaged by a pin projecting from the other part.

The grooves or other guiding formations may be produced by machining or, more simply, by integral molding with the corresponding barrel portion.

Figure 4:
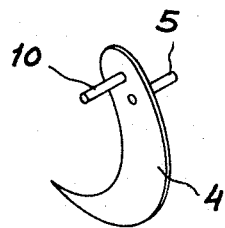
Figure 1:
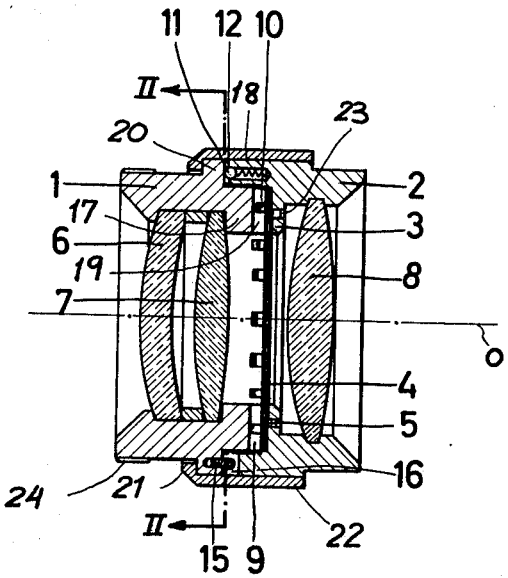
Figure 2:
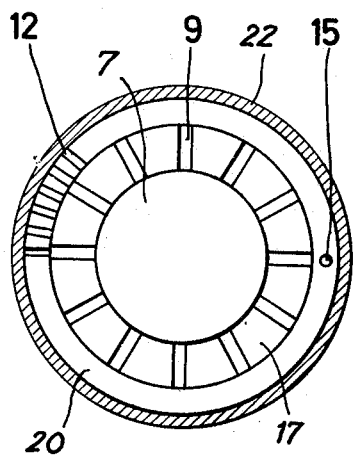
Figure 3:
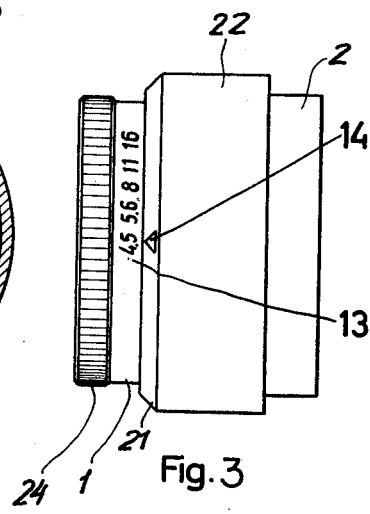

The above and other features of my invention will become more fully apparent from the following detailed description, reference being made to the accompanying drawing in which:

FIG. 1 is an axial sectional view of an objective with an axially subdivided lens barrel embodying the present invention;
FIG. 2 is a cross-sectional view taken on the line II—II of FIG. 1;
FIG. 3 is a side-elevational view of the objective shown in FIG. 1; and
FIG. 4 is a perspective view of an iris leaf forming part of a diaphragm in the objective.

The objective shown in the drawing comprises a front component, consisting of two lenses 6 and 7, and a rear component, consisting of a lens 8, with an intervening iris diaphragm composed in the usual manner of a multiplicity of iris leaves 4. Component 6, 7 is mounted in a front portion 1 of a lens barrel formed with an annular shoulder 17 just forwardly of the position of the diaphragm. Component 8 is similarly mounted in a rear portion 2 of the lens barrel having an annular shoulder 3 which confronts the shoulder 17 of portion 1. A ring-shaped extremity 18 of barrel portion 2 embraces the shoulder 17 and spans the diaphragm-accommodating gap 19 between the two shoulders. An outer flange 20 on barrel portion 1, set back from shoulder 17, is embraced by an annular lip 21 on a ring 22 which is rigid with barrel portion 2, as by being fastened to it by a set of screws not shown; ring 22 could also be integral with barrel portion 2, in which case lip 21 may be formed by crimping over an overhanging edge of that ring.

Shoulder 3 is formed with a multiplicity of peripherally spaced holes 23 receiving pins 5 of respective iris leaves 4 which are pivotable about these pins and which also carry pins 10 engaging in radial guide slots 9 on shoulder 17. Thus, relative rotation of barrel portions 1 and 2 about the optical axis O causes the leaves 4 to swing in or out, depending on the direction of rotation; such rotation is facilitated by the provision of a knurled zone 24 at the front of barrel portion 1. The limits of relative rotation are determined by a pin 15 on part 1 projecting into a peripheral cutout 16 in the reduced ring portion 18 of part 2. Within these limits, the two parts may be indexed in several different relative positions with the aid of a spring-pressed detent 11, such as a ball check, co-operating with a series of peripherally spaced recesses 12. The corresponding diaphargm stops can be read on a scale 13 on part 1 with the aid of a mark 14 on lip 21.

It will be apparent that the specific structure described and illustrated may be modified in various respects, e.g. in regard to the nature of the rotation-limiting means 15, 16.

I claim:
1. An optical objective comprising a plurality of components defining an optical axis;
    a lens barrel centered on said axis, said barrel being axially subdivided into two juxtaposed parts each supporting at least one of said components, said parts having confronting annular shoulders separated by a gap and encircling said axis;
    an iris diaphragm in said gap consisting of a plurality of iris leaves each pivotally mounted on one of said shoulders, the other of said shoulders being provided with guiding formations engaging said leaves for displacing same into different operating positions upon relative rotation of said parts about said axis;
    co-operating indexing means on said parts for releasably retaining same in different relative positions corresponding to predetermined diaphragm stops, one of said parts having an external flange set back from its shoulder, the other of said parts having a ring-shaped extremity projecting axially beyond the shoulder thereof toward said flange and bridging said gap, said indexing means being disposed on confronting surfaces of said flange and said extremity;

and an annular lip on said other of said parts overlying said flange in positive engagement therwith to hold said parts together.

2. An objective as defined in claim 1 wherein said formations are generally radial grooves, said leaves being provided with pins respectively received in said grooves.

3. An objective as defined in claim 1 wherein said indexing means includes a spring-loaded detent in said extremity, said flange having a set of peripherally spaced recesses engageable by said detent.

4. An objective as defined in claim 1 wherein said lip and an exposed portion of said one of said parts are provided with co-operating diaphragm-stop markings.

5. An objective as defined in claim 1 wherein said extremity is formed with an arcuate cutout, said flange being provided with a pin projecting into said cutout for limiting the relative rotatability of said parts.

References Cited

UNITED STATES PATENTS

| | | | |
|---|---|---|---|
| 1,676,595 | 7/1928 | Wittel | 95—64 XR |
| 2,322,034 | 6/1943 | Lee | 95—64 |
| 2,556,546 | 6/1951 | Lee | 95—64 |
| 2,918,856 | 12/1959 | Tesch | 95—64 |
| 3,185,064 | 5/1965 | Armbruster et al. | 95—64 |
| 3,349,681 | 10/1967 | Kellner | 95—64 |
| 3,362,313 | 11/1968 | Wollensak et al. | 95—64 |

NORTON ANSHER, Primary Examiner

JOSEPH F. PETERS, JR., Assistant Examiner